United States Patent [19]

John

[11] Patent Number: 4,509,286
[45] Date of Patent: Apr. 9, 1985

[54] TRAWL SHRIMP CAGE

[76] Inventor: Martin John, 205 Brunswick Ct., New Orleans, La. 70114

[21] Appl. No.: 537,172

[22] Filed: Sep. 29, 1983

Related U.S. Application Data

[63] Continuation of Ser. No. 322,023, Nov. 16, 1981, abandoned.

[51] Int. Cl.³ .................... A01K 71/00; A01K 73/12
[52] U.S. Cl. .................................................. 43/9
[58] Field of Search ................... 43/5, 7, 8, 9, 103, 43/104, 105, 106; 114/255

[56] References Cited

U.S. PATENT DOCUMENTS

| | | | |
|---|---|---|---|
| 478,579 | 7/1892 | Dunham | 114/255 |
| 1,667,700 | 4/1928 | Hanken | 43/104 |
| 2,413,552 | 12/1946 | Ethridge | 43/103 |
| 2,727,707 | 12/1955 | Wells | 114/255 |
| 2,948,980 | 8/1960 | Worcester | 43/9 |
| 4,028,821 | 6/1977 | Hanks | 43/102 |
| 4,125,955 | 11/1978 | Puretie | 43/8 |

Primary Examiner—Nicholas P. Godici
Assistant Examiner—M. Jordan
Attorney, Agent, or Firm—Charles C. Garvey

[57] ABSTRACT

A vessel supported shrimp trawl cage system provides a pair of spaced apart nets which are supported at the water surface by the vessel so that a forward end of the net defines a net opening and the rear of the net defines a tail. A pair of cages corresponding to the pair of nets are supported in a partially submerged position by the vessel and have a cage inlet which is forward facing and connects to the tail of the net so that shrimp caught in the net are fed into the cage via the tail of the net. The cage includes a plurality of cage surfaces of preferably rigid perforated material such as expanded metal and are connected at their edges to form an enclosure which confines the shrimp entering the cage from the nets. Confinement is preferably on the top, sides, and bottom as well as the rear so that the shrimp cannot escape by swimming or by jumping from the cage. The rear of the cage provides a removable opening so that trash, fish, small shrimp, or other unwanted marine life can be discharged from the net as desired.

7 Claims, 4 Drawing Figures

TRAWL SHRIMP CAGE

This is a continuation of U.S. Ser. No. 322,023 filed Nov. 16, 1981 now abandoned.

BACKGROUND OF THE INVENTION

1. Field of the Invention

The present invention relates to trawls and, more particularly, to an improved shrimp trawl using a controlled cage which is operated at the surface so that marine life being caught can be continually viewed and unwanted fish, marine life, and small shrimp can be released unharmed during trawling.

2. General Background

In the fishing/shrimping industry, it is well known to employ an elongated net having an opening at one end and a closed tail at the other end portion when trawling for shrimp. Shrimp trawls are elongated nets which are generally pulled behind a vessel. The nets can be pulled along the sea bottom, at various depths, and also at the water surface. Trawling at the water surface is usually done at night because shrimp will feed at the water surface at night. They usually remain at the water bottom during daylight hours.

Examples of a typical underwater type shrimp trawl can be seen in U.S. Pat. No. 2,940,980 entitled "Commercial Shrimp Net" issued to J. T. Worcester. Another example of a typical underwater trawl is U.S. Pat. No. 2,890,543 issued to R. O. Mitchell entitled "Trawl Net Attachment."

An example of a top water shrimping device is U.S. Pat. No. 1,498,760 issued to P. M. Skrmetti entitled "Floating Trawl" issued June 24, 1924.

Problems exist with prior type shrimp trawls which render them useless or less than efficient in the harvesting of shrimp. One of the problems with the conventional shrimp trawl is that the user cannot view the net during harvesting. Rather the fisherman pulls the net for long periods of time; the net is then raised to examine what has been caught. Unfortunately, a good bit of the aquatic life caught in the net is not harvestable shrimp of sufficient size. Some aquatic life caught in the net is not shrimp at all. For example, non-shrimp aquatic life such as small fish, crabs, and the like can be caught in the net. Undersized shrimp which are not suitable for harvesting can be caught in the net. Much of this aquatic life is killed by the trawling process when these life forms are caught in the net and dragged for long periods of time. This "blind" system results in a tremendous waste of marine life, and extra work for the shrimper since the killed "trash" must be sorted from the shrimp.

Another problem of prior type trawls is the handling of the trawl itself. Usually the net is an elongated structure which is pulled a distance behind the boat. In order to harvest the shrimp which are caught in the net, the net must be pulled up into the boat without losing the shrimp which have been caught. Trawls are awkward and difficult to pull into the boat. This job is both arduous and time consuming. In very rough seas, it can be dangerous. A sorting process must also be used to determine which of the catch is to be retained and which of the catch is to be discarded.

3. General Discussion of the Present Invention

The present invention provides a solution to the above discussed problems by providing a shrimp trawl cage apparatus which can be used with a vessel, when preferably two nets are supported at the water surface by the vessel on port and starboard sides respectively. The net provides a frame supporting the net inlet opening and the other end of the net defines a tail which is also open. The tail connects to and communicates with a cage which is supported in a partially submerged position by the vessel. The cage provides an inlet which is fed by the tail of the net. The cage is an enclosed structure having a number of cage surfaces which are connected at their edges to form an enclosure confining the shrimp entering the cage. A rear gate portion of the cage has a removable opening which can be closed or opened so that shrimp which enter the cage can be selectively discharged from the cage. The cage has an open top so that shrimp to be harvested can be removed, even during trawling.

Mounting brackets affix each of the net and cage assemblies to the vessel in a lateral position with respect to and generally parallel to the vessel. The brackets provide an adjustability for moving the cage with respect to the net so that the net can be tightened or slackened by movement of the cage with respect to the net. The adjustability is preferably in the form of an elongated rail affixed to the vessel gunwhale. Cage brackets slideably affix the cage to the rail so that the rail can function as an adjustable support between the cage and the vessel. The cage can thus slide longitudinally with respect to the net so that forward movement of the cage slackens the net and rearward movement of the cage tightens the net. The forward slackened position would be assumed during unloading of the cage while the rearward tightened position of the cage would be the trawling position. The cage would preferably pivot from its position at the water surface upwardly about the rail into the vessel for unloading purposes.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

DETAILED DESCRIPTION OF THE PREFERRED EMBODIMENT

FIGS. 1-4 illustrate the preferred embodiment of the apparatus of the present invention designated generally by the numeral 10.

Figure 1:
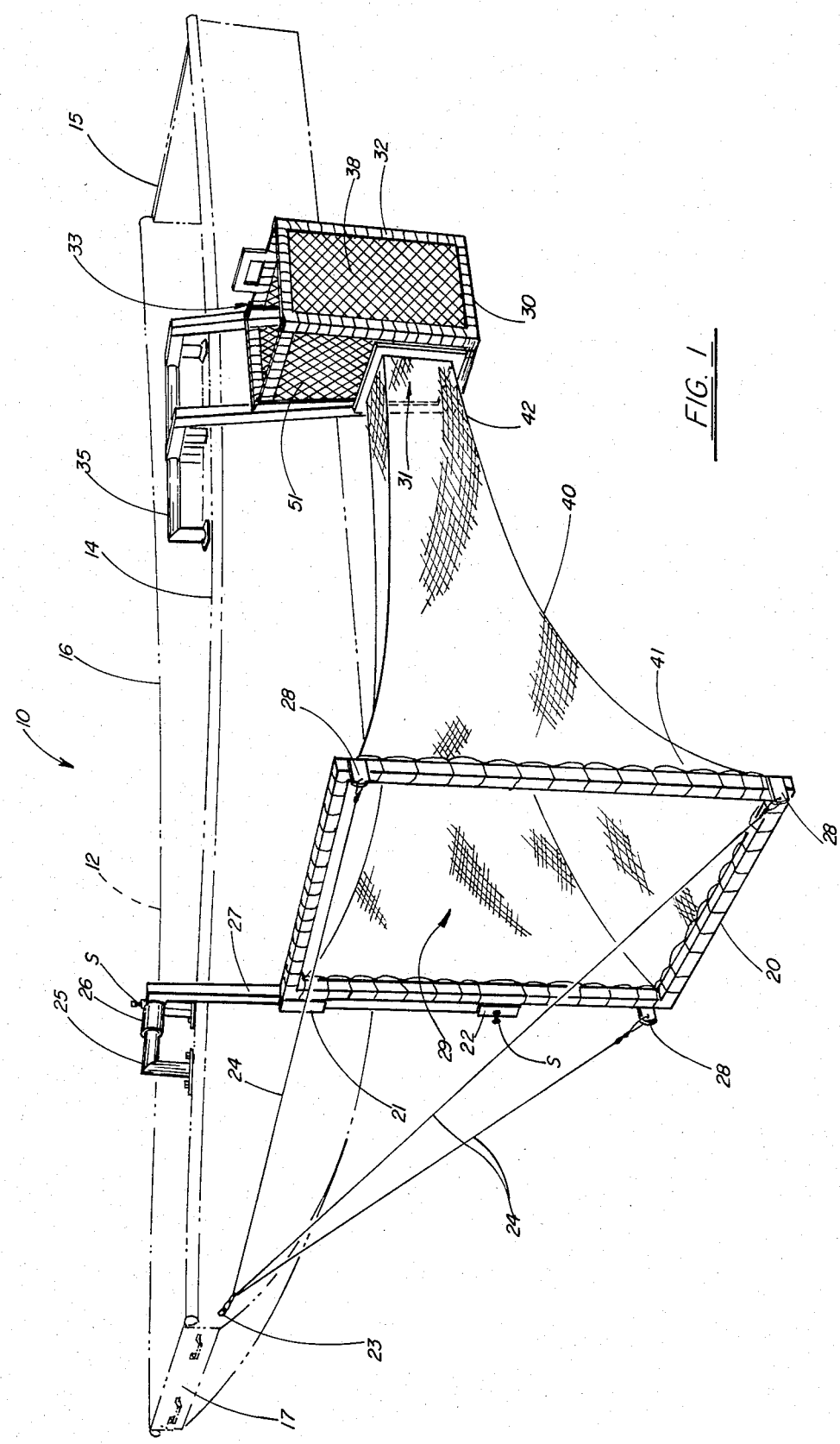
FIG. 1 is a perspective view of the preferred embodiment of the apparatus of the present invention shown in use on a marine vessel with the marine vessel shown in phantom lines.

In FIG. 1 there can be seen an improved shrimp trawl apparatus 10 as used in combination with a marine vessel 12. The vessel 12 provides port 14 and starboard 16 gunwale portions. The stern 15 of vessel 12 is in the form of a transom adapted to receive an outboard motor while 17 designates the bow of the vessel. Affixed to the bow 17 end portion of vessel 12 can be seen net frame 20 which is preferably rectangular or square. Frame 20 defines an opening 29 through which shrimp can be gathered during the trawling process. Net frame 20 is supported by bracket 25 which is bolted, for example, to the port or starboard gunwale 14 or 16 of vessel 12. Bracket 25 is preferably cylindrical, and a sleeve connector 26 affixes to bracket 25 so that it can spin with respect thereto. A set screw S can affix sleeve connector 26 to bracket 25. An elongated support arm 27 extends from sleeve connector 26 and engages net frame 20 by means of a pair of spaced apart sleeves 21, 22. The sleeves would preferably have a cross section corresponding to the cross section of arm 27 so that the net frame 20 would slide upwardly and downwardly upon arm 27 for adjustment of its fishing depth. A set screw S, as shown on sleeve 22, would form a rigid connection between net frame 20 and arm 27 when a desired position with the water surface is made. For additional support, a plurality of tensile wire connectors 24 would be attached to net frame 20 at load eyelets 28. The opposite end portion of wire connectors 24 would be attached to vessel 12 near the bow portion thereof at eyelet 23. These connectors could be, for example, quick disconnect connections or the like for easy disassembly. Wire connectors could be stainless steel cable for example.

Figure 2:
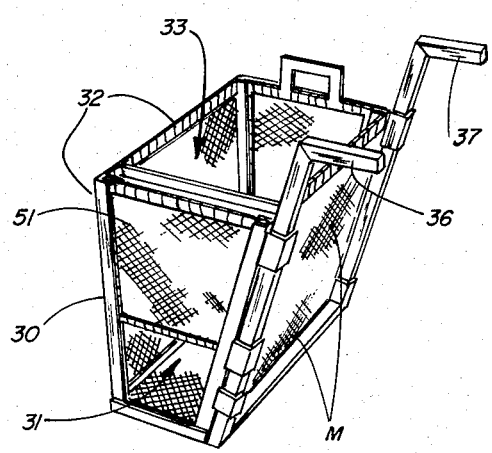
FIG. 2 is a perspective view of the cage portion of the preferred embodiment of the apparatus of the present invention.
Figure 3:
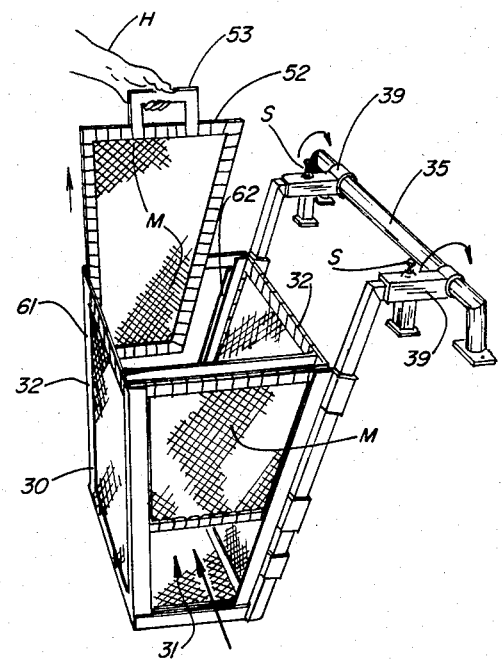
FIG. 3 is a perspective view of the cage portion of the preferred embodiment of the apparatus of the present invention shown with the mounting brackets which affix the cage to the marine vessel.
Figure 4:
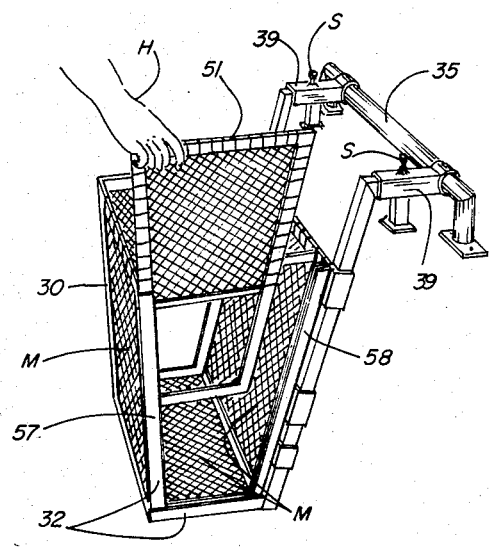
FIG. 4 is a perspective view of the cage portion of the preferred embodiment of the apparatus of the present invention showing removal of one of the cage panels.

A second support bracket 35 is affixed to each gunwale 14, 16 of vessel 12 by bolting or other such similar means. Bracket 35 is a cage bracket and is also shown in FIGS. 3 and 4 as removed from vessel 12. As with bracket 25 which supports net frame 20, cage bracket 35 is circular in cross section and supports a pair of sleeve connectors 39 so that they can rotate with respect to bracket 35. Each sleeve connector 39 has a socket which is receptive of the upper end portions respectively of support arms 36, 37. In FIG. 2, the cage 30 is shown removed from sleeve connectors 39. In FIGS. 3 and 4, a connection between sleeves 39 and cage support arms 36, 37 has been completed. Set screws S can form a rigid connection between sleeves 39 and arms 36, 37 during use. The connections between sleeve connectors 39 and cage support arms 36, 37 can be disassembled by loosening set screws S on sleeve connectors 39 and removing the upper portions of arms 36, 37 from the sockets of sleeve connectors 39. A similar socket-like connection could be provided with sleeve 26 and arm 27.

Since sleeve connectors 39 rotate about bracket 35 as shown by the curved arrows in FIG. 3, it will be appreciated that cage 30 can be rotated out of the water and into the interior of vessel 12. Net frame 20 can also rotate with sleeve 26 rotating about bracket 25 so that net frame 20 can rotate into the interior of vessel 12. Net frame 20 and cage 30 would normally be rotated inboard of vessel 12, for example, before and after trawling was completed such as, for example, when the vessel was leaving or returning to dock.

The construction of cage 30 will now be discussed more fully with respect to FIGS. 2, 3, and 4. Cage 30 provides an inlet 31 which is connected to the tail 42 portion of net 40. Once the apparatus is assembled as shown in FIG. 1, the net 40 has basically three operational portions including the main body of the net 40, the forward portion 41 which is laced to net frame 20, and the rear or tail portion 42 which is laced to forward cage gate 51 and about opening 31. In FIGS. 2, 3, and 4, the net is not shown laced to opening 31 for purposes of illustration. Opening 31 allows the shrimp caught in net 40 to enter cage 30 during the trawling operation. Cage 30 comprises a plurality of structural members 32 which are connected together by welding, for example. These individual frame members 32 can be, for example, structural aluminum tubing which is square in cross section. A spanning surface between individual frame members 32 is provided by a mesh material such as expanded metal, nylon net, or the like. This mesh material is designated in the drawings by the letter M. Cage 30 provides an uppermost opening 33 which allows the fisherman to remove shrimp from the cage 30 interior. Otherwise, the only opening in cage 30 is the inlet 31 which is connected to the tail 42 of net 40. The cage provides forward 51 and aft 52 removable gate sections. The forward gate section 51 is removable. Upon removal one skilled in the art will notice that not only is gate section 51 disconnected from cage 30 but the tail 42 of net 40 is also disconnected from cage 30. As best shown in FIG. 4, the hand H of a fisherman is shown removing forward gate section 51. A pair of spaced apart grooved tracks 57, 58 are provided which receive section 51 thereinto and secure its position during operation. The edges of section 51 are generally flat and fit into the grooves of the tracks 57, 58.

Similarly, rear section 52 of cage 30 is removable as shown in FIG. 3. The edges of rear gate section 52 are flat and likewise register with a pair of provided grooved tracks 61, 62. Rear section 52 provides a handle 53 so that it can be gripped and removed by the hand H of the fisherman. Sleeves and set screws can be used to slideably attach cage 30 to arms 36–37. Such sleeves could be welded, for example, to cage 30 and would be of similar construction to the sleeves 21, 22 as aforedescribed which support net frame 20.

Rear section 52 can be removed even during the trawling operation so that unwanted marine life can be harmlessly released from cage 30. Thus, for example, if the fisherman catches shrimp which are too small, or if the fisherman catches other marine life such as small fish, minnows, crabs, and the like, these can be released simply by lifting rear section 52 when the fisherman grips handle 53. When rear section 52 is in its proper operating position, it forms a closure to the rear portion of cage 30. Water can escape from cage 30 because of its mesh M covering, but shrimp and other aquatic life will be retained in the cage 30. A mesh size small enough to catch harvestable shrimp would be used such as one quarter to one inch ($\frac{1}{4}''$–1$''$) openings. The effect of this construction is that it allows the fisherman to remove the desirable portions of the catch such as larger shrimp by reaching into opening 33 and retrieving them by hand. However, on larger vessels, a conveyor belt could be used to continuously remove the caught shrimp from cage 30. Any unwanted portion of the catch can be released by raising the rear gate section 52 as shown in FIG. 3 so that the catch can escape unharmed. This is an environmentally desirable feature because it allows the fisherman to keep only those fish that he intends to use and allows him to quickly release those forms of marine life which are of no value to him or which cannot be caught legally by means of a trawl, such as undersized shrimp and the like.

It should be understood that while the embodiment of FIG. 1 illustrates a single net frame 20, net 40 and cage 30, normally a pair of the shrimp trawl cages 10 would be used on port and starboard sides of vessel 12. The pair of apparatus 10 would be matched in size and dimensions so as to have balanced drag during operation.

Because many varying and different embodiments may be made within the scope of the inventive concept herein taught, and because many modifications may be made in the embodiments herein detailed in accordance with the descriptive requirement of the law, it is to be understood tht the details herein are to be interpreted as illustrative and not in a limiting sense.

What is claimed as the invention is:

1. A vessel supported shrimp trawl cage, comprising:
   a. at least one net supported at the water surface by the vessel so that a forward end of the net defines a net opening which can entrap shrimp swimming near the water surface and the rear of the net defines a tail;
   b. cage means supported in a partially submerged position by the vessel and having a cage inlet fed by the tail of the net so that shrimp caught in the net will eventually enter the cage and a cage outlet for discharging contents of the cage during trawling; and
   c. gate means attachable to the cage means at the cage outlet for closing the cage outlet to retain the contents of the cage means during trawling;
   d. frame means affixed to the vessel and extending laterally for supporting the net and the cage means in a lateral position with respect to and generally parallel to the vessel; and
   e. the frame means comprises in part adjustable means for moving the cage means with respect to the net opening so that the net can be tightened or slackened by movement of the cage relative to the net.

2. The shrimp trawl cage of claim 1 wherein a pair of nets and a corresponding pair of cage means are supported respectively on the port and starboard sides of the vessel.

3. The shrimp trawl cage of claim 1 wherein the cage means is a generally rectangular enclosure having at least two sides, a top, and a bottom.

4. The shrimp trawl cage of claim 1 wherein the adjustable means includes a rail mounted on the vessel and a cage bracket slideably connecting the cage means and the rail.

5. The shrimp trawl cage of claim 4 wherein the rail is parallel to the central axis of the net and cage means assembly.

6. The shrimp trawl cage of claim 1 wherein the frame means includes a net frame and a cage means frame spaced therefrom and independently movable with respect to the net frame.

7. The shrimp trawl cage of claim 1 wherein the cage means has an open top which allows removal of any desirable marine life from the cage means when the gate means is closed.

* * * * *